United States Patent [19]
Gencarelli et al.

[11] 4,098,764
[45] Jul. 4, 1978

[54] 1,5-BIS(3′,5′-DI-HYDROCARBYL-4′-HYDROXYPHENYL)PENTYL AMINES

[75] Inventors: Richard A. Gencarelli, Cheshire; Edward L. Wheeler, Watertown, both of Conn.

[73] Assignee: Uniroyal, Inc., New York, N.Y.

[21] Appl. No.: 719,540

[22] Filed: Sep. 1, 1976

Related U.S. Application Data

[60] Division of Ser. No. 553,338, Feb. 26, 1975, Pat. No. 3,996,194, and a continuation-in-part of Ser. No. 285,969, Sep. 5, 1972, abandoned.

[51] Int. Cl.$^2$ .................. C08K 5/20; C07C 109/04
[52] U.S. Cl. .................. 260/45.85 S; 260/45.9 R; 260/45.9 NN; 260/45.9 AD; 260/569; 260/570.5 R; 260/571
[58] Field of Search .................. 260/45.9 R, 45.9 AD, 260/45.9 NN, 569, 570, 570.5 R, 571, 45.85 S

[56] References Cited
U.S. PATENT DOCUMENTS

| | | | |
|---|---|---|---|
| 2,654,722 | 10/1953 | Young et al. | 260/45.9 NC |
| 2,683,132 | 7/1954 | Young et al. | 260/45.9 NC |
| 3,282,939 | 11/1966 | Spivack | 260/56.2 A |
| 3,433,835 | 3/1909 | Miller et al. | 260/45.9 NC |
| 3,594,424 | 8/1971 | Krueger | 260/45.95 R |
| 3,776,884 | 12/1973 | Spivack | 260/45.85 R |
| 3,780,103 | 12/1973 | Knell | 260/562 A |
| 3,856,846 | 12/1974 | Eggensperger | 260/45.85 B |

OTHER PUBLICATIONS

Whittman Monatsh (94), pp. 686-687 693/1963.

Primary Examiner—V. P. Hoke
Attorney, Agent, or Firm—Paul H. Ginsburg

[57] ABSTRACT

This invention is directed to 1,5-bis(3′,5′-dihydrocarbyl-4′-hydroxyphenyl)pentyl derivatives, including the 3-pentyl ester, amine and amide compounds. It also deals with the stabilization of organic materials by incorporating such compounds therein, either alone or in combination with a dialkyl 3,3′-thiodipropionate or a tri(alkaryl)phosphite.

17 Claims, No Drawings

1,5-BIS(3',5'-DI-HYDROCARBYL-4'-HYDROXY-PHENYL)PENTYL AMINES

This application is a division of copending patent application Ser. No. 553,338, filed Feb. 26, 1975 now U.S. Pat. No. 3,996,194 which is, in turn, a continuation-in-part of patent application Ser. No. 285,969, filed Sep. 5, 1972, now abandoned.

This invention is concerned with compounds having the formula

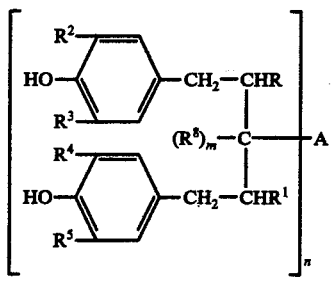

wherein R and R¹ may be the same or different and are hydrogen, alkyl having 1 to 4 carbon atoms, alkylene or alkylidene groups having 1 to 3 carbons and partipating in a carbocyclic ring having from 5 to 7 carbons, said ring including the carbon to which A is attached, said A being other than —OH or =O; preferably R and R¹ are hydrogen, methyl, ethyl, methylene, ethylene, ethylidene, and isopropylidene; and most preferably are hydrogen, methyl or methylene. R², R³, R⁴ and R⁵ are hydrogen, alkyl of from 1 to 9 carbons or alkyl of from at least 3 to 9 carbons if A is —OH or =O; R² through R⁵ may also be cycloalkyl having 5 to 7 carbon atoms, aryl having 6 to 10 carbons, aralkyl or alkaryl or from 7 to 10 carbon atoms. Preferably R², R³, R⁴ and R⁵ are hydrogen, methyl, ethyl, propyl, isopropyl, n-butyl, isobutyl, sec-butyl, tert-butyl, cyclohexyl and alpha-methylstyryl; and most preferably are tert-butyl. A is =O, trivalent PO₃ or PO₄, —OR⁶, —OCOR⁶, —O-COR⁷COO—, —N(R⁶)₂, —N(R⁶)R⁷N(R⁶)—, —N(R⁶)COR⁶, —N(R⁶)SO₂R⁶, —N(R⁶)COR⁷CON(R⁶)— and —N(COR⁶)R⁷N(COR⁶)—. R⁶ is hydrogen, alkyl having 1 to 18 carbon atoms, cycloalkyl or from 3 to 7 carbon atoms, aryl having 6 to 10 carbons, aralkyl or alkaryl having 7 to 10 carbon atoms, hydroxyalkyl, alkoxyalkyl, alkylaminoalkyl or alkylthioalkyl having 2 to 5 carbon atoms. When A comprises a plurality of R⁶ groups they can be the same or different. Preferably R⁶ is hydrogen, alkyl having 1 to 18 carbon atoms, cycloalkyl having 5 to 7 carbon atoms, aryl having 6 to 10 carbon atoms, aralkyl or alkaryl having 7 to 10 carbon atoms. Usually R⁶ is hydrogen, alkyl having 1 to 10 carbon atoms, cycloalkyl having 5 to 6 carbon atoms, aryl having 6 to 10 carbon atoms and aralkyl having 7 carbons. R⁷ is a single bond, alkylene or alkylidene having 1 to 8 carbon atoms, oxydialkylene or thiodialkylene having 4 to 10 carbon atoms, and arylene of from 6 to 10 carbon atoms, preferably ethylene, oxydiethylene, thiodiethylene and phenylene. R⁸ is hydrogen, alkyl having 1 to 18 carbon atoms, cycloalkyl of from 3 to 7 carbon atoms, aryl having 6 to 10 carbon atoms, and alkaryl or aralkyl having 7 to 10 carbon atoms, preferably hydrogen, methyl, ethyl, propyl, isopropyl, butyl, cyclohexyl and phenyl. m may be 0 or 1, and n has a value of 1, 2 or 3 corresponding to the functionality of A, except that it is 1 when A is attached to the same pentyl carbon by a double bond.

Prior Art

In U.S. Pat. No. 3,594,424, R. Krueger discloses compounds of Formula I in which R and R' form a five or six membered ring and A is a keto-oxygen.

In German Offenlegungsschrift 2,009,504 (assigned to BASF), there is disclosed a number of compounds of Formula I where R and R' are H or together are cycloalkyl and A is a hydroxy group, a keto oxygen, a cyclic acetal or a cyclic thioacetal group.

The only other published record of compounds of Formula I is a paper by H. Wittmann, Monatsh 94, 686-93 (1963). In the compounds disclosed, R and R' are H and R² through R⁵ are H or CH₃ and A is a keto-oxygen or hydroxy group.

There is, however, no published record known to us of any compound of Formula I as disclosed and claimed herein.

Exposition of the Invention

The compounds of Formula I are prepared by the condensation of 3,5-di-alkyl-4-hydroxy benzaldehyde [prepared by the method of G. M. Coppinger and T. W. Campbell, J. Am. Chem. Soc. 75, 734-736 (1953)] with various ketones as described by Wittmann [Monatsh 94, 686-93 (1963)] and Ger. Offen. 2,009,504 and further in *Organic Reactions*, Vol. 16. The solvents used in these condensations were alcohols. A generalized equation for this reaction is:

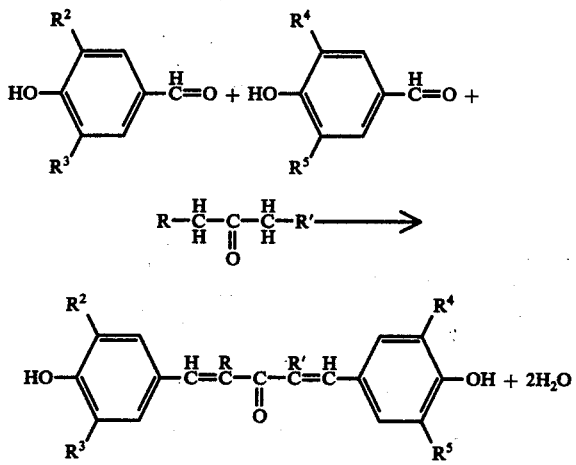

The catalyst for the reaction is gaseous hydrogen chloride. It is used in a saturated alcoholic solution.

The resulting pentadienone is then reduced catalytically to the pentanol-3 or pentanone-3 by use of hydrogen with a suitable catalyst [R. Cornubert and H. G. Eggert, Bull. Soc. Chim. France 1954, 522-3 (1954)]. Alternatively, the pentadienone may be converted into the saturated ketone and the latter is then reduced as described in German Offen. 2,009,504 or by other known methods for reducing a ketone to an alcohol.

The pentanol-3 is then reacted with an equimolar amount of an acid, acid chloride or acid anhydride in a hydrocarbon or a chlorine-substituted hydrocarbon solvent at temperatures of 20° – 140° C in order to obtain the 3-pentyl esters. Polybasic acids may be used to obtain poly-esters.

The preparation of the amides involved, first, the catalyzed reductive alkylation of the 3-pentanone with ammonia or an amine in an alcohol. The new 3-pentylamine was then reacted with an equimolar amount of an acid, acid chloride or an acid anhydride in a hydrocarbon or a chlorine-substituted hydrocarbon solvent at temperatures of 20° – 140° C to give the desired amide. Polybasic acids may also be used to obtain polyamides.

Among the suitable acids, acid anhydrides or acid chlorides employed in the execution of this invention are formic, acetic, propionic, butanoic, hexanoic, decanoic, lauric, stearic, benzoic, phenylacetic, oxalic, succinic, adipic, phthalic, terephthalic, toluic, salicylic, phosphorus trichloride, and phosphorus oxychloride.

Among the suitable amines employed in the reductive alkylation are ammonia, methylamine, ethylamine, propylamine, isopropylamine, n-butylamine, sec-butylamine, isobutylamine, t-butylamine, n-pentylamine, isopentylamine, n-hexylamine, n-octylamine, n-dodecylamine, n-octadecylamine, cyclopentylamine, cyclohexylamine, ethylenediamine, propylenediamine, hexamethylenediamine, aniline, benzylamine and 2-aminoethanol.

Among the solvents useful in carrying out the production of the compounds of this invention are methanol, ethanol, isopropanol, hexane, cyclohexane, benzene, toluene, xylene, chloroform, carbon tetrachloride and dichloroethane.

Suitable catalysts used to effect the required reductions are palladium on carbon, platinum on carbon, nickel on kieselguhr and Raney nickel.

The chemical compounds of this invention are useful as stabilizers, preservatives or antioxidants for organic materials (e.g., polymers, animal, mineral or vegetable oils, fish oil, fats, gasoline, etc.) normally subject to deterioration upon exposure to such adverse influences as air, heat, and light. They are especially effective in combination with dialkyl 3,3'-thiodipropionates, e.g., dilauryl 3,3'-thiodipropionate. Hydrocarbon-chain polymers, including polyolefins (e.g., polyethylene, cross-linked polyethylene, polypropylene, ethylene-propylene copolymer), diene polymers (e.g., polybutadiene, polyisoprene) or copolymers of dienes with copolymerizable monoethylenically unsaturated monomers (e.g., styrene, acrylonitrile, isobutylene, vinyl pyridine, acrylic acid, acrylates, ethylene, propylene, as in butadiene-styrene copolymer, butadiene-acrylonitrile copolymer, isobutyleneisoprene copolymer, ethylene-propylene-diene [e.g., dicyclopentadiene, ethylidene norbornene, methylene norbornene, 1,4-hexadiene, cyclooctadiene] terpolymers) are stabilized, using the present chemicals as antioxidants, as are such non-hydrocarbon polymers as, e.g., polyurethanes, polycarbonates, polyesters, polyvinyl chloride, styrene-acrylonitrile resin, ABS polymers. Of the compounds of this invention, the esters and amines are preferred, while the amides are most preferred in that they provide the greatest effectiveness as stabilizers for organic materials. From 0.01% to 4% by weight, based on the weight of the substrate, of the chemicals of this invention are desirably added to the substrates mentioned to protect them against the effects of air, heat and light. Synergistic protection is afforded by further including from 0.01% to 4% by weight, based on the weight of the substrate, of a dialkyl (e.g., alkyl of 8 to 20 carbon atoms) 3,3'-thiodipropionate; or by including from 0.1% to 5% by weight, based on the weight of the substrate, of a triaryl phosphite in which each aryl group contains one or two alkyl groups containing at least 8 carbon atoms. Such phosphites are those which are the subject of U.S. Pat. No. 2,733,226.

The ketones and alcohols within the scope of this invention have utility as intermediates for the preparation of the other compounds of this invention. Included among the ketones of this invention are:

1,5-bis(3'-isopropyl-4'-hydroxyphenyl) pentanone-3
1,5-bis(3'-t-butyl-4'-hydroxyphenyl) pentanone-3
1,5-bis(3'-sec-butyl-4'-hydroxyphenyl) pentanone-3
1,5-bis[3'-(alpha-methylstyryl)-4'-hydroxyphenyl] pentanone-3
1,5-bis(3'-hexyl-4'-hydroxyphenyl) pentanone-3
1,5-bis(3'-cyclohexyl-4'-hydroxyphenyl) pentanone-3
1,5-bis(3'-nonyl-4'-hydroxyphenyl) pentanone-3
1,5-bis(3',5'-di-isopropyl-4'-hydroxyphenyl) pentanone-3
1,5-bis(3',5'-di-t-butyl-4'-hydroxyphenyl) pentanone-3
1,5-bis(3',5'-di-sec-butyl-4'-hydroxyphenyl) pentanone-3
1,5-bis[3',5'-di-(alpha-methylstyryl)-4'-hydroxyphenyl] pentanone-3
1,5-bis(3'-methyl-5'-butyl-4'-hydroxyphenyl) pentanone-3
1-(3',5'-di-isopropyl-4'-hydroxyphenyl)-5-(4"-hydroxyphenyl) pentanone-3
1-(3',5'-di-t-butyl-4'-hydroxyphenyl)-5-(4"-hydroxyphenyl) pentanone-3
1-(3',5'-di-isopropyl-4'-hydroxyphenyl)-5-(3",5"-di-t-butyl-4"-hydroxyphenyl) pentanone-3
1,5-bis(3',isopropyl-4'-hydroxyphenyl)-2-methyl pentanone-3
1,5-bis(3'-t-butyl-4'-hydroxyphenyl)-2-methyl pentanone-3
1,5-bis(3',5'-di-t-butyl-4'-hydroxyphenyl)-2-methyl pentanone-3
1,5-bis(3'-methyl-5'-t-butyl-4'-hydroxyphenyl)-2-ethyl pentanone-3
1,5-bis(3'-sec-butyl-4'-hydroxyphenyl)-2,4 dimethyl pentanone-3
1,5-bis(3'-cyclohexyl-4'-hydroxyphenyl)-2-methyl-4-ethyl pentanone-3
1,5-bis(3',5'-di-isopropyl-4'-hydroxyphenyl)-2,4-dimethyl pentanone-3

Included among the alcohols of this invention are:
1,5-bis(3'-isopropyl-4'-hydroxyphenyl) pentanol-3
1,5-bis(3'-t-butyl-4'-hydroxyphenyl) pentanol-3
1,5-bis(3'-sec-butyl-4'-hydroxyphenyl) pentanol-3
1,5-bis[3'-(alpha-methylstyryl)-4'-hydroxyphenyl] pentanol-3
1,5-bis(3'-hexyl-4'-hydroxyphenyl) pentanol-3
1,5-bis(3'-cyclohexyl-4'-hydroxyphenyl) pentanol-3
1,5-bis(3'-nonyl-4'-hydroxyphenyl) pentanol-3
1,5-bis(3',5'-di-isopropyl-4'-hydroxyphenyl) pentanol-3
1,5-bis(3',5'-di-t-butyl-4'-hydroxyphenyl) pentanol-3
1,5-bis(3',5',di-sec-butyl-4'-hydroxyphenyl) pentanol-3
1,5-bis[3',5'-di-(alpha-methylstyryl)-4'-hydroxyphenyl] pentanol-3
1,5-bis(3'-methyl-5'-t-butyl-40'-hydroxyphenyl) pentanol-3
1-(3',5'-di-isopropyl-4'-hydroxyphenyl)-5-(4"-hydroxyphenyl) pentanol-3
1-(3',5'-di-t-butyl-4'-hydroxyphenyl)-5-(4"-hydroxyphenyl) pentanol-3
1-(3',5'-di-isopropyl-4'-hydroxyphenyl)-5-(3",5"-di-t-butyl-4"-hydroxyphenyl) pentanol-3

1,5-bis(3'-isopropyl-4'-hydroxyphenyl)-2-ethyl pentanol-3
1,5-bis(3'-t-butyl-4'-hydroxyphenyl)-2-butyl pentanol-3
1,5-bis(3',5'-di-t-butyl-4'-hydroxyphenyl)-2-methyl pentanol-3
1,5-bis(3'-methyl-5'-t-butyl-4'-hydroxyphenyl)-2-propyl pentanol-3
1,5-bis(3'-sec-butyl-4'-hydroxyphenyl)-2,4-diethyl pentanol-3
1,5-bis(3'-cyclohexyl-4'-hydroxyphenyl)-2-ethyl-4-methyl pentanol-3
1,5-bis(3',5'-di-t-butyl-4-hydroxyphenyl)-2,4-dimethyl pentanol-3
1,5-bis(3'-isopropyl-4'-hydroxyphenyl)-3-methyl pentanol-3
1,5-bis(3'-t-butyl-4'-hydroxyphenyl)-3-ethyl pentanol-3
1,5-bis(3'-sec-butyl-4'-hydroxyphenyl)-3-propyl pentanol-3
1,5-bis[3'-(alpha-methylstyryl)-4'-hydroxyphenyl]-3-butyl pentanol-3
1,5-bis(3'-hexyl-4'-hydroxyphenyl)-3-isopropyl pentanol-3
1,5-bis(3'-cyclohexyl-4'-hydroxyphenyl)-3-cyclohexyl pentanol-3
1,5-bis(3'-nonyl-4'-hydroxyphenyl)-3-phenyl pentanol-3
1,5-bis(3',5'-di-isopropyl-4'-hydroxyphenyl)-3-isopropyl pentanol-3
1,5-bis(3',5'-di-t-butyl-4'-hydroxyphenyl)-3-t-butyl pentanol-3
1,5-bis(3'-methyl-5'-t-butyl-4'-hydroxyphenyl)-3-methyl pentanol-3
1,5-bis(3'-isopropyl-4'-hydroxyphenyl)-2,3-dimethyl pentanol-3
1,5-bis(3'-t-butyl-4'-hydroxyphenyl)-2-methyl-3-ethyl pentanol-3
1,5-bis(3'-sec-butyl-4'-hydroxyphenyl)-2-methyl-3-propyl pentanol-3
1,5-bis(3'-cyclohexyl-4'-hydroxyphenyl)-2-methyl-3-cyclohexyl pentanol-3
1,5-bis(3',5'-di-t-butyl-4'-hydroxyphenyl)-2-methyl-3-t-butyl pentanol-3
1,5-bis(3',5'-di-isopropyl-4'-hydroxyphenyl)-2-methyl-3-isopropyl pentanol-3
1,5-bis(3'-isopropyl-4'-hydroxyphenyl)-2,4-dimethyl-3-ethyl pentanol-3
1,5-bis(3'-sec-butyl-4'-hydroxyphenyl)-2,3,4-trimethyl pentanol-3
1,5-bis(3'-t-butyl-4'-hydroxyphenyl)-2,4-diethyl-3-butyl pentanol-3
1,5-bis(3',5'-di-t-butyl-4'-hydroxyphenyl)-2,4-dimethyl-cyclohexyl pentanol-3
1,5-bis(3',5'-di-isopropyl-4'-hydroxyphenyl)-2,3,4-trimethyl pentanol-3
1,5-bis(3'-methyl-5'-t-butyl-4'-hydroxyphenyl)-2,3,4-triethyl pentanol-3

Suitable esters within the scope of this invention include:

1,5-bis(3'-isopropyl-4'-hydroxyphenyl)-3-pentylacetate
bis[1,5-bis(3'-t-butyl-4'-hydroxyphenyl)-3-pentyl] succinate
bis[1,5-bis(3'-sec-butyl-4'-hydroxyphenyl)-3-pentyl]-beta,beta'-thiodipropionate
bis[1,5-bis(3'-hexyl-4'-hydroxyphenyl)-3-pentyl] phthalate
1,5-bis(3',5'-di-t-butyl-4'-hydroxyphenyl)-3-pentyl benzoate
1,5-bis(3',5'-di-isopropyl-4'-hydroxyphenyl)-3-pentyl stearate
1,5-bis(3'-methyl-5'-t-butyl-4'-hydroxyphenyl)-3-pentyl butyrate
1,5-bis(3'-t-butyl-4'-hydroxyphenyl)-3-methyl-3-pentyl acetate
1,5-bis(3',5'-di-isopropyl-4'-hydroxyphenyl)-3-phenyl-3-pentyl benzoate
1.5-bis(3'-isopropyl-4'-hydroxyphenyl)-2-methyl-3-pentyl acetate bis[1,5-bis(3'-t-butyl-4'-hydroxyphenyl)-2-butyl-3-pentyl] succinate
bis[1,5-bis(3',5'-di-t-butyl-4'-hydroxyphenyl)-2-ethyl-3-pentyl] phthalate
1,5-bis(3'-methyl-5-t-butyl-4'-hydroxyphenyl)-2-methyl-3-pentyl stearate
1,5-bis(3'-sec-butyl-4'-hydroxyphenyl)-2,4-dimethyl-3-pentyl acetate
1,5-bis(3'-cyclohexyl-4'-hydroxyphenyl)-2,4-diethyl-3-pentyl benzoate
1,5-bis(3'-isopropyl-4'-hydroxyphenyl)-2,3-dimethyl-3-pentyl butyrate
1,5-bis(3'-t-butyl-4'-hydroxyphenyl)-2,3-dimethyl-3-pentyl benzoate
bis[1,5-bis(3',5'-di-t-butyl-4'-hydroxyphenyl)-2,3-dimethyl-3-pentyl] succinate
1,5-bis(3',5'-di-isopropyl-4'-hydroxyphenyl)-2,3-dimethyl-4-ethyl-3-pentyl acetate
1,5-bis(3'-methyl-5'-t-butyl-4'-hydroxyphenyl)-2,3,4-trimethyl-3-pentyl stearate Among the amines included within this invention are:

N-[1,5-bis(3'-isopropyl-4'-hydroxyphenyl)-3-pentyl]-N-methyl-N-phenyl amine
N-[1,5-bis(3'-t-butyl-4'-hydroxyphenyl)-3-pentyl]-N-ethyl-N-butyl amine
Tris[1,5-bis(3'-[alpha-methylstyryl]-4'-hydroxyphenyl)-3-pentyl] amine
N-[1,5-bis(3'-sec-butyl-4'-hydroxyphenyl)-3-pentyl]-N-n-octadecyl amine
N-[1,5-bis(3'-hexyl-4'-hydroxyphenyl)-3-pentyl]-N-n-hexyl amine
N-[1,5-bis(3'-cyclohexyl-4'-hydroxyphenyl)-3-pentyl]-N-cyclohexyl amine
N,N'-bis[1,5-bis(3'-nonyl-4'-hydroxyphenyl)-3-pentyl] hexamethylene diamine
N,N'-bis[1,5-bis(3',5'-di-isopropyl-4'-hydroxyphenyl)-3-pentyl] ethylene diamine
N,N'-bis[1,5-bis(3',5'-di-t-butyl-4'-hydroxyphenyl)-3-pentyl] propylene diamine
N-[1,5-bis(3',5'-di-sec-butyl-4'-hydroxyphenyl)-3-pentyl]-N-butyl amine
N-[1,5-bis(3'-methyl-5'-t-butyl-4'-hydroxyphenyl)-3-pentyl]-N-methyl amine
N-[1-(3',5'-di-t-butyl-4'-hydroxyphenyl)-5-(4''-hydroxyphenyl)]-3-pentyl amine
1,5-bis(3'-isopropyl-4'-hydroxyphenyl)-2-methyl-3-pentyl amine
N-[1,5-bis(3'-t-butyl-4'-hydroxyphenyl)-2-methyl-3-pentyl]-N-methyl amine
N-[1,5-bis(3',5'-di-t-butyl-4'-hydroxyphenyl)-2-methyl-3-pentyl]-N,N-diethyl amine
1,5-bis(3'-isopropyl-4'-hydroxyphenyl)-2,4-dimethyl-3-pentyl amine
N-[1,5-bis(3',5'-di-t-butyl-4'-hydroxyphenyl)-2,4-dimethyl-3-pentyl]-N-methyl amine Typical amides within the scope of this invention include:

N-[1,5-bis(3'-isopropyl-4'-hydroxyphenyl)-3-pentyl]-N-n-octadecyl stearamide
N-[1,5-bis(3'-t-butyl-4'-hydroxyphenyl)-3-pentyl]-N-n-octyl butyramide
N-[1,5-bis(3'-sec-butyl-4'-hydroxyphenyl)-3-pentyl]-N-n-octadecyl acetamide
N,N'-bis[1,5-bis(3'-hexyl-4'-hydroxyphenyl)-3-pentyl]-N,N'-diacetyl ethylene diamine
N-[1,5-bis(3'-cyclohexyl-4'-hydroxyphenyl)-3-pentyl]-N-cyclohexyl propionamide
N,N'-bis[1,5-bis(3'-nonyl-4'-hydroxyphenyl)-3-pentyl]-N,N'-diacetyl hexamethylene diamine
N-[1,5-bis(3',5'-di-isopropyl-4'-hydroxyphenyl)-3-pentyl]-N-butyl stearamide
N-[1,5-bis(3',5'-di-t-butyl-4'-hydroxyphenyl)-3-pentyl] butyramide
N-[1,5-bis(3',5'-di-sec-butyl-4'-hydroxyphenyl)-3-pentyl]-N-methyl acetamide
N-[1,5-bis(3'-methyl-5't-butyl-4'-hydroxyphenyl)-3-pentyl]-N-butyl benzamide
N,N'-bis[1,5-bis(3',5'-di-t-butyl-4'-hydroxyphenyl)-3-pentyl] succinamide
N,N'-bis[1,5-bis(3',5'-di-isopropyl-4'-hydroxyphenyl)-3-pentyl]-beta, beta'-thiodipropionamide
N-[1,5-bis(3',5'-di-t-butyl-4'-hydroxyphenyl)-2-methyl-3-pentyl] benzene sulfonamide
N-[1,5-bis(3'-isopropyl-4'-hydroxyphenyl)-2-methyl-3-pentyl]-N-methyl acetamide
N-[1,5-bis(3'-t-butyl-4'-hydroxyphenyl)-2-methyl-3-pentyl]-N-n-butyl butyramide
N-[1,5-bis(3'-isopropyl-4'-hydroxyphenyl)-2,4-dimethyl-3-pentyl] stearamide Other suitable compounds of this invention are:

2,5-bis(3',5'-diisopropyl-4'-hydroxybenzyl)cyclopentanone
2,5-bis(3',5'-di-t-butyl-4'-hydroxybenzyl)3-methylcyclopentanone
2,5-bis(3',5'di-t-butyl-4'-hydroxybenzyl)3,3-dimethylcyclopentanone
2,6-bis[3',5'-di-(alpha-methylstyryl)-4'-hydroxybenzyl]cyclohexanone
2,6-bis(3',5'-dicyclohexyl-4'-hydroxybenzyl)3,5-dimethylcyclohexanone
2,6-bis(3',5'-di-t-butyl-4'-hydroxybenzyl)3,3,5-trimethylcyclohexanol
2,5-bis(3',5'-di-t-butyl-4'-hydroxybenzyl)methoxycyclopentane
2,6-bis(3',5'-di-t-butyl-4'-hydroxybenzyl)ethoxycyclohexane
2,5-bis(3',5'-di-t-butyl-4'-hydroxybenzyl)cyclopentyl formate
2,5-bis(3',5'-di-t-butyl-4'-hydroxybenzyl)cyclopentyl acetate
2,6-bis(3',5'-di-t-butyl-4'-hydroxybenzyl)cyclohexyl stearate
2,5-bis(3',5'-di-t-butyl-4'-hydroxybenzyl)cyclopentyl decanoate
2,6-bis(3',5'-di-t-butyl-4'-hydroxybenzyl)cyclohexyl cyclohexanecarboxylate
2,5-bis(3',5'-di-t-butyl-4'-hydroxybenzyl)cyclopentyl benzoate
2,6-bis(3',5'-diisopropyl-4'-hydroxybenzyl)cyclohexyl naphthalenecarboxylate
2,5-bis(3',5'-di-t-butyl-4'-hydroxybenzyl)cyclopentyl beta-phenylacetate
2,5-bis(3'5'-di-t-butyl-4'-hydroxybenzyl)cyclopentylamine
N-[2,6-bis(3',5'-di-t-butyl-4'-hydroxybenzyl)cyclohexyl]-N-methylamine
N-[2,5-bis(3',5'-di-t-butyl-4'-hydroxybenzyl)cyclopentyl]-N-methylacetamide
N-[2,6-bis(3',5'-di-t-butyl-4'-hydroxybenzyl)cyclohexyl] stearamide
N-[2,5-bis(3',5'-di-t-butyl-4'-hydroxybenzyl)cyclopentyl] undecamide
N-[2,6-bis(3',5'-diisopropyl-4'-hydroxybenzyl)cyclohexyl] benzenesulfonamide Also:

N-[1,5-bis(3',5'-di-t-butyl-4!-hydroxyphenyl)-3-pentyl]-N-methylstearylsulfonamide
N-[1,5-bis(3',5'-diisopropyl-4'-hydroxypenyl)3-pentyl]-N-stearylmethanesulfonamide
N-[1,5-bis(3',5'-di-t-butyl-4'-hydroxyphenyl)3-pentyl]-N-cyclohexyltoluenesulfonamide
N,N'-bis[1,5-bis(3',5'-di-t-butyl-4'-hydroxyphenyl)3-pentyl] -N,N'-diethyloxamide
N,N'-bis[1,5-bis(3',5'-di-t-butyl-4'-hydroxyphenyl)3-pentyl] -N,N'-dimethyladipamide
N,N'-bis[1,5-bis(3',5'-di-t-butyl-4'-hydroxyphenyl)3-pentyl] -N,N'-dimethylsebacamide Also:
2,2'-oxydiethylenebis{N,N'-bis[1,5-bis(3',5'-diisopropyl-4'-hydroxyphenyl)3-pentyl]carboxamide}
3,3'-oxydipropylenebis≃N,N'-bis[1,5-bis(3',5'-di-t-butyl-4'-hydroxyphenyl)3-pentyl]carboxamide}
5,5'-oxydipentylenebis{N,N'-bis[1,5-bis(3',5'-di-t-butyl-4'-hydroxyphenyl)3-pentyl]carboxamide}
1,4-phenylenebis{N,N'-bis[1,5-bis(3',5'-di-t-butyl-4'-hydroxyphenyl)3-pentyl]carboxamide}
N-[1,5-bis(3',5'-di-t-butyl-4'-hydroxyphenyl)-2,4-dimethyl3-pentyl]-N-methyl acetamide Among the pentadienones useful in forming the compounds of this invention are:
1,5-bis(3'-isopropyl-4'-hydroxyphenyl) pentadien-1,4-one-3
1,5-bis(3'-t-butyl-4'-hydroxyphenyl) pentadien-1,4-one-3
1,5-bis(3'-cyclohexyl-4'-hydroxyphenyl) pentadien-1,4-one-3
1,5-bis(3',5'-di-isopropyl-4'-hydroxyphenyl) pentadien-1,4-one-3
1,5-bis(3',5'-di-t-butyl-4'-hydroxyphenyl) pentadien-1,4-one-3
1,5-bis(3'-methyl-5'-t-butyl-4'-hydroxyphenyl) pentadien-1,4-one-3
1,5-bis(3'-isopropyl-4'-hydroxyphenyl)-2-methyl pentadien-1,4-one-3
1,5-bis(3',5'-di-t-butyl-4'-hydroxyphenyl)-2-methyl pentadien1,4-one-3
1,5-bis(3'-methyl-5'-t-butyl-4'-hydroxyphenyl)-2-methyl pentadien-1,4-one-3
1,5-bis(3'-t-butyl-4'-hydroxyphenyl)-2,4-dimethyl pentadien-1,4-one-3
1,5-bis(3'-hexyl-4'-hydroxyphenyl)-2,4-dimethyl pentadien1,4-one- 3 1,5-bis(3',5'-di-isopropyl-4'-hydroxyphenyl)-2,4-dimethyl pentadien-1,4-one-3

The following represent generalized methods of preparation of certain of the compounds of this invention: N-[1,5-Bis(3',5'-di-hydrocarbyl-4'-hydroxyphenyl)-3-pentyl]-N-hydrocarbyl amine In a 1-gallon stirred autoclave are placed 1.0 mole of 1,5-bis(3',5'-di-hydrocarbyl-4'-hydroxyphenyl)penta-none-3, 1.0 mole of a hydrocarbyl amine, 1000 ml. of alcohol and 10 gm. of Pd/C. The mixture is heated from room temperature to 125° C and 400-800 PSIG of hydrogen for 1-5 hours.

The catalyst is removed by filtration and the alcohol is removed at reduced pressure. The residue is dissolved in hot hexane and allowed to cool. The resulting amine is removed by filtration.

N-[1,5-Bis(3',5'-di-hydrocarbyl-4'-hydroxyphenyl)-3-pentyl]-N-hydrocarbyl-N-hydrocarbyl amine In a 2 l., four-neck, round-bottom flask equipped with a thermometer, mechanical stirrer, dropping funnel and condenser is placed 1.0 mole of N-[1,5-bis(3',5'-di-hydrocarbyl-4'-hydroxyphenyl)-3-pentyl]-N-hydrocarbyl amine, 1.0 mole of triethylamine and 1000 ml. of a hydrocarbon solvent. To this stirred solution is added slowly 1.0 mole of a hydrocarbyl halide and cooling is applied when necessary. After all of the halide has been added, the mixture is refluxed for 2-4 hours. The triethylamine hydrochloride is removed by filtration and the solvent is removed at reduced pressure. The residue is dissolved in hot hexane and allowed to cool. The tertiary amine is removed by filtration.

N-[1,5-Bis(3',5'-di-hydrocarbyl-4'-hydroxyphenyl)-3-pentyl]-N,N-di-hydrocarbyl amine In a 2 l., four-neck, round-bottom flask equipped with a thermometer, mechanical stirrer, dropping funnel and condenser are placed 1.0 mole of 1,5-bis(3',5'-di-hydrocarbyl-4'-hydroxyphenyl)-3-pentyl amine, 2.0 moles of triethyl amine and 1000 ml. of a hydrocarbon solvent. To this stirred solution are added slowly 2.0 moles of a hydrocarbyl halide and cooling is applied when necessary. After all of the halide has been added, the mixture is refluxed for 2-4 hours. The triethylamine hydrochloride is removed by filtration and the solvent removed at reduced pressure. The residue is dissolved in hot hexane and allowed to cool. The resulting tertiary amine is removed by filtration.

1,5-Bis(3',5'-di-hydrocarbyl-4'-hydroxyphenyl)-3-hydrocarbyl-3-pentyl esters

In a 2 l., four-neck, round-bottom flask equipped with a thermometer, mechanical stirrer, dropping funnel and condenser are placed 1.0 mole of 1,5-bis(3',5'-di-hydrocarbyl-4'-hydroxyphenyl)-3-nydrocarbyl pentanol-3, 1.0 mole of triethylamine and 1000 ml. of a hydrocarbon solvent. To this stirred solution is added 1.0 mole of an acid chloride. After all of the acid chloride has been added, the mixture is refluxed for 2-4 hours and the triethylamine hydrochloride is removed by filtration. The solvent is removed at reduced pressure and the residue dissolved in hot hexane and allowed to cool. The ester is removed by filtration.

N-[1,5-Bis(3',5'-di-hydrocarbyl-4'-hydroxyphenyl)-3-pentyl]-N-hydrocarbyl amides In a 2 l., four-neck, round-bottom flask equipped with a thermometer, mechanical stirrer, dropping funnel and condenser are placed 1.0 mole of N-[1,5-bis(3',5'-di-hydrocarbyl-4'-hydroxyphenyl)-3-pentyl[-N-hydrocarbyl amine, 1.0 mole of triethylamine and 1000 ml. of hydrocarbon solvent. To this stirred solution is added 1.0 mole of acid chloride. After all of the acid chloride has been added, the mixture is refluxed for 2-4 hours. The triethylamine hydrochloride is removed by filtration and the solvent is removed at reduced pressure. The residue is dissolved in hot hexane and allowed to cool. The amide is removed by filtration.

The following represent generalized methods of preparation of intermediates useful in this invention:

1,5-Bis(3',5'-di-hydrocarbyl-4'-hydroxyphenyl)pentadien-1,4-one-3

In a 2 l., three-neck, round-bottom flask equipped with a thermometer, mechanical stirrer and gas addition tube with condenser are placed 1.0 mole of 3,5-di-hydrocarbyl-4-hydroxybenzaldehyde, 0.5 mole of a ketone and 1000 ml. of solvent. Hydrogen chloride gas is bubbled into the mixture for 3-4 hours while the temperature is maintained at 0°-15° C. The reaction mixture is then poured into ice water and the pentadienone removed by filtration. The pentadienone is then recrystallized from alcohol.

1,5-Bis(3',5'-di-hydrocarbyl-4'-hydroxyphenyl)pentanone-3

In a 1-gallon stirred autoclave are placed 1.0 mole of 1,5-bis(3',5'-di-hydrocarbyl-4'-hydroxyphenyl)pentadien-1,4-one-3, 1000 ml. of alcohol and 28 gm. of nickel on kieselguhr. The mixture is heated at 50°-125° C and using 400-800 PSIG of hydrogen for 1-5 hours. The pentanone-3 is recrystallized from alcohol.

1,5-Bis(3',5'-di-hydrocarbyl-4'-hydroxyphenyl)pentanol-3

In a 1-gallon stirred autoclave are placed 1.0 mole of 1,5-bis(3',5'-di-hydrocarbyl-4'-hydroxyphenyl)pentadien1,4-one-3, 10 gm. of 5% palladium on carbon and 1000 ml. of alcohol. The mixture is heated to 125° C using 400-800 PSIG of hydrogen for 1-5 hours.

The catalyst is removed by filtration and the alcohol is removed at reduced pressure. The residue is dissolved in hot hexane and the hexane solution is allowed to cool. The pentanol-3 is removed by filtration. 1,5-Bis(3',5'-di-hydrocarbyl-4'-hydroxyphenyl)-3-hydrocarbyl pentanol-3

In a 3 l., four-neck, round-bottom flask equipped with a thermometer, mechanical stirrer, dropping funnel and condenser are placed 1.1 moles of magnesium turnings and 1000 ml. of diethyl ether. To this is added slowly 1.0 mole of an alkyl or aryl halide. After all of the halide has been added, the Grignard reagent is refluxed for 1 hour.

The mixture is then cooled to room temperature and 1.0 mole of 1,5-bis(3',5'-di-hydrocarbyl-4'-hydroxyphenyl) pentanone-3 in 1000 ml. of diethyl ether is added slowly to the Grignard reagent so as to maintain constant reflux. After all of the pentanone-3 has been added, the reaction mixture is refluxed for 2 hours. The mixture is cooled and then poured into ice water. This mixture is made acid and the layers are separated. The diethyl ether layer is dried and then the ether is removed at reduced pressure. The residue is dissolved in hot hexane and allowed to cool. The tertiary alcohol is removed by filtration.

The invention is further disclosed by the following Examples:

EXAMPLE #1

3,5-Di-t-butyl-4-hydroxy benzaldehyde

In a 5 l., four-neck, round-bottom flask equipped with a thermometer, mechanical stirrer, dropping funnel and vent tube were placed 600 gm. of 2,6-di-t-butyl-p-cresol and 3600 ml. of t-butyl alcohol. To this stirred solution at 25°-35° C were added 908 gm. of $Br_2$ over a period of ten hours. The resulting solid was separated by filtration, washed with hexane and dried. The yield was 440 gm. (71%) of aldehyde melting at 187°-189° C.

EXAMPLE #2

1,5-Bis(3',5'-di-t-butyl-4'-hydroxyphenyl)pentanone-3

In a 1 gal. stirred autoclave were placed 200 gm. (0.408 mole) of 1,5-bis(3',5'-di-t-butyl-4'-hydroxyphenyl) pentadien-1,4-one-3, 1200 ml. of isopropanol and 28 gm. of a nickel catalyst (50% Ni/kieselguhr). The mixture was heated for 1.25 hours at 100° C and 575–705 PSIG of hydrogen; 0.79 mole (97%) of hydrogen was absorbed.

The mixture was heated to boiling and filtered to remove the catalyst. On cooling, the hydrogenated ketone separated. The yield was 192 gm. (97%) and the product melted at 138°–140° C.

EXAMPLE #3

1,5-Bis(3',5'-di-t-butyl-4'-hydroxyphenyl)pentanol-3

In a 1 gal. stirred autoclave were placed 200 gm. of 1,5-bis(3',5'-di-t-butyl-4'-hydroxyphenyl) pentadien-1,4-one-3, 1200 ml. of isopropanol and 10 gm. of 5% PD/C. The reaction was run at room temperature and 420–580 PSIG of hydrogen for 2.75 hours; 1.11 moles (91%) of hydrogen were absorbed.

The catalyst was removed by filtration and the isopropanol was removed at reduced pressure. The residue was dissolved in hot hexane and allowed to cool. The product alcohol separated and was removed by filtration. The yield was 180 gm. (89%); m.p. 129°–30° C.

EXAMPLE #4

1,5-Bis(3',5'-di-t-butyl-4'-hydroxyphenyl)-3-pentyl acetate

In a 500 ml., three-neck, round-bottom flask equipped with a thermometer, mechanical stirrer and condenser were placed 30 gm. (0.061 mole) of 1,5-bis(3',5'-di-t-butyl-4'-hydroxyphenyl)pentanol-3 and 250 ml. of acetic anhydride. The mixture was heated at 90° C on a steam bath for four hours. After cooling, the mixture was poured into water. A material separated which solidified on standing, m.p. 82°–5° C.

EXAMPLE #5

1,5-Bis(3',5'-di-t-butyl-4'-hydroxyphenyl)-3-pentyl acetate

In a 500 ml., three-neck, round-bottom flask equipped with a thermometer, mechanical stirrer and condenser were placed 18.0 gm. (0.0364 mole) of 1,5-bis(3',5'-di-t-butyl-4'-hydroxyphenyl)pentanol-3, 5.5 gm. (0.07 mole) of acetyl chloride and 250 ml. of benzene. The mixture was refluxed for six hours on a steam bath.

The solvent was removed at reduced pressure and the oily residue chromatographed on alumina. The isolated product was an oil. The infrared spectrum agrees with the Example #1 product prepared from acetic anhydride.

EXAMPLE #6

1,5-Bis(3',5'-di-t-butyl-4'-hydroxyphenyl)-3-pentyl stearate

In a 500 ml., three-neck, round-bottom flask equipped with a thermometer, mechanical stirrer and condenser were placed 10.0 gm. (0.02 mole) of 1,5-bis(3',5'-di-t-butyl-4'-hydroxyphenyl)pentanol-3, 10.0 gm. of stearoyl chloride and 250 ml. of xylene. The mixture was refluxed for 8 hours, then cooled and washed with aqueous sodium hydroxide (6N) and finally with water. The xylene was removed at reduced pressure and the residue recrystallized from hexane. The stearate is a waxy solid; m.p. 52°–4° C.

EXAMPLE #7

1,5-Bis(3',5'-di-t-butyl-4'-hydroxyphenyl)-3-pentyl benzoate

In a 500 ml., three-neck, round-bottom flask equipped with a thermometer, mechanical stirrer and condenser were placed 10.0 gm. (0.02 mole) of 1,5-bis(3',5'-di-t-butyl-4'-hydroxyphenyl)pentanol-3, 5.0 gm. of benzoyl chloride and 250 ml. of xylene. The mixture was refluxed for eight hours and then cooled. The mixture was washed with aqueous sodium hydroxide (6N), water and then dried over sodium sulfate. The xylene was removed at reduced pressure and the residue recrystallized from hexane. The yield of product was 7.5 gm.; m.p. 115°–6° C.

EXAMPLE #8

Bis[1,5-bis(3',5'-di-t-butyl-4'-hydroxyphenyl)-3-pentyl] succinate

In a 500 ml., three-neck, round-bottom flask equipped with a thermometer, mechanical stirrer and condenser were placed 10.0 gm. (0.02 mole) of 1,5-bis(3',5'-di-t-butyl-4'-hydroxyphenyl)pentanol-3, 1.55 gm. (0.01 mole) of succinyl chloride and 250 ml. of xylene. The mixture was refluxed for eight hours. After cooling, the mixture was washed with sodium hydroxide and water. The xylene layer was dried over sodium sulfate and the xylene removed at reduced pressure. The residue was recrystallized from hexane. 7.9 gm. of the succinate were isolated; m.p. 132°–3° C.

EXAMPLE #9

Bis[1,5-bis(3',5'-di-t-butyl-4'-hydroxyphenyl)-3-pentyl] adipate

In a 500 ml., three-neck, round-bottom flask equipped with a thermometer, mechanical stirrer and condenser were placed 15.0 gm. (0.03 mole) of 1,5-bis(3',5'-di-t-butyl-4'-hydroxyphenyl)pentanol-3, 3.0 gm. (0.016 mole) of adipyl chloride and 250 ml. of toluene. The mixture was refluxed for 5 hours. After cooling, the mixture was washed with sodium hydroxide and water and then dried over sodium sulfate. The toluene was removed by distillation and the residual oil was chromatographed on alumina. Index of refraction, $N_D^{29} = 1.502$. Infrared and nuclear magnetic resonance spectra on the isolated oil indicate this to be the desired product. The infrared curve had the following characteristics:

2.7 mu; hindered phenolic band
3.25 mu; C-H band
5.7 mu; ester carbonyl band
6.9 mu; phenyl nucleus band
12.6–13 mu; phenyl substitution band The NMR curve provided the following information:
6.9 delta; 4 phenyl protons
5.0 delta; 1 methine proton
4.9 delta; 2 phenolic protons
2.7–1.6 delta; 12 methylene protons
1.4 delta; 36 t-butyl protons These characteristics correspond to the expected values.

EXAMPLE #10

Bis [1,5-bis(3',5'-di-t-butyl-4'-hydroxyphenyl)-3-pentyl] phthalate

In a 500 ml., three-neck, round-bottom flask equipped with a thermometer, mechanical stirrer and condenser were placed 24.8 gm. (0.05 mole) of 1,5-bis(3',5'-di-t-butyl-4'-hydrophenyl)pentanol-3, 5.3 gm. of phthaloyl chloride and 250 ml. of toluene. The mixture was refluxed for 8 hours, then allowed to cool.

The mixture was washed with sodium hydroxide and water and then dried over sodium sulfate. The toluene was removed at reduced pressure. The product was chromatographed on alumina and an oil was isolated. The ester solidified on standing; m.p. 82°–5° C. Infrared and nuclear magnetic resonance spectra indicated this to be the desired product. The infrared curve had the following characteristics:
- 2.7 mu; hindered phenolic band
- 5.75 mu; ester carbonyl band
- 6.95 mu; phenyl nucleus band
- 12.6–13.0 mu; phenyl substitution band The NMR curve provided the following information:
- 7.4 delta; 4 ortho-substituted phenyl protons
- 6.85 delta; 8 meta-phenyl protons
- 5.1 delta; 2 methine protons
- 4.8 delta; 2 phenolic protons
- 2.7–1.6 delta; 16 methylene protons
- 1.4 delta; 72 t-butyl protons These characteristics correspond to the expected values.

EXAMPLE #11

Bis[1,5-bis(3',5'-di-t-butyl-4'-hydroxyphenyl)-3-pentyl]-beta, beta'-thiodipropionate In a 500 ml., three-neck, round-bottom flask equipped with a thermometer, mechanical stirrer and condenser were placed 15 gm. (0.03 mole) of 1,5-bis(3',5'-di-t-butyl-4'-hydroxyphenyl)pentanol-3, 3.3 gm. of beta, beta'-thiodipropionyl chloride and 250 ml. of xylene. The mixture was refluxed for 8 hours and allowed to cool. The solvent was removed. The product was chromatographed on alumina and an oil was isolated. Index of refraction, $N_D^{29} = 1.512$. Infrared and nuclear magnetic resonance spectra indicated this to be the desired product. The infrared curve had the following characteristics:
- 2.7 mu; hindered phenolic band
- 5.7 mu; ester carbonyl band
- 6.9 mu; phenyl nucleus band
- 12.6–13.0 mu; phenyl substitution band The NMR curve provided the following information:
- 6.95 delta; 4 phenyl protons 5.1 delta; 1 methine proton
- 5.0 delta; 1 phenolic proton
- 2.7–1.6 delta; 12 methylene protons
- 1.4 delta; 36 t-butyl protons These characteristics correspond to the expected values.

EXAMPLE #12

Tris[1,5-bis(3',5'-di-t-butyl-4'-hydroxyphenyl)-3-pentyl] phosphite

In a 500 ml., three-neck, round-bottom flask equipped with a thermometer, mechanical stirrer and condenser were placed 15 gm. (0.03 mole) of 1,5-bis(3',5'-di-t-butyl-4'-hydroxyphenyl)pentanol-3, 25 ml. of triethylamine and 250 ml. of chloroform. To this stirred mixture were added 1.4 gm. of phosphorous trichloride. The reaction was exothermic. After the exotherm had subsided, the mixture was refluxed for two hours and then cooled.

The mixture was washed with water, dried over sodium sulfate and the solvent was removed at reduced pressure. The residue was recrystallized from ethanol-water and gave a solid, m.p. 117–20° C. P analysis: calc. 2.05; found 2.1. Infrared and nuclear magnetic resonance spectra confirmed this structure. The infrared curve had the following characteristics:
- 2.75 mu; hindered phenolic band
- 3.35 mu; C-H band
- 6.95 mu; phenyl nucleus band
- 9.8 and 10.5 mu; P-O-C bands
- 12.6–13.0 mu; phenyl substitution band The NMR curve provided the following information
- 6.95 delta; 4 aromatic protons
- 4.95 delta; 2 phenolic protons
- 4.3 delta; 1 methine proton
- 2.7–1.6 delta; 8 methylene protons
- 1.4 delta; 36 t-butyl protons These characteristics correspond to the expected values.

EXAMPLE #13

1,5-Bis(3',5'-di-t-butyl-4'-hydroxyphenyl)-3-pentylamine

In a 1-gallon stirred autoclave were placed 113 gm. (0.229 mole) of 1,5-bis(3',5'-di-t-butyl-4'-hydroxyphenyl) pnetanone, 35 ml. of ammonium hydroxide (58%), 1200 ml. of isopropanol and 13 gm. of 5% palladium on carbon (Pd/C). The mixture was heated for 2 hours at 125° C and 765 PSIG of hydrogen. 0.247 mole of hydrogen was absorbed.

The mixture was filtered to remove the catalyst and the isopropanol was removed at reduced pressure. The residue was dissolved in hot hexane and allowed to cool. The amine was removed by filtration. The yield was 74 gm., m.p. 110° C.

EXAMPLE #14

N-[1,5-bis(3',5'-di-t-butyl-4'-hydroxyphenyl)-3-pentyl]-N-methylamine

In a 1-gallon stirred autoclave were placed 200 gm. (0.405 mole) of 1,5-bis(3',5'-di-t-butyl-4'-hydroxyphenyl)pentanone-3, 70 ml. of 40% methylamine, 1000 ml. of isopropanol and 13 gm. of 5% Pd/C. The mixture was heated at 55°–60° C and 595–645 PSIG of hydrogen for 5.5 hours, 0.39 mole of hydrogen was absorbed.

The catalyst was removed by filtration and the isopropanol was removed at reduced pressure. The residue was dissolved in hot hexane and allowed to cool. No solid separated so the hexane solution was saturated with gaseous hydrogen chloride. This gave 186 gm. of the amine hydrochloride, m.p. 202°–4° C.

The amine was regenerated by treatment of the amine hydrochloride with base. The viscous residue was dissolved in hot hexane and allowed to cool. The solid amine melted at 127°–9° C.

EXAMPLE #15

N-[1,5-Bis(3',5'-di-t-butyl-4'-hydroxyphenyl)-3-pentyl]-N-n-butylamine

In a 1-gallon stirred autoclave were placed 200 gm. (0.405 mole) of 1,5-bis(3',5'-di-t-butyl-4'-hydroxyphenyl) pentanone-3, 35 gm. of n-butylamine, 1200 ml. of isopropanol and 15 gm. of 5% Pd/C. The mixture was heated for 0.75 hour at 90° C and 620 PSIG of hydrogen, then 1.25 hours at 125° C and 670 PSIG of hydrogen. 0.4 mole of hydrogen was absorbed.

The catalyst was removed by filtration and the isopropanol was removed at reduced pressure. The residue was dissolved in hot hexane and cooled. No solid separated so the hexane solution was saturated with gaseous hydrogen chloride. This gave 164 gm. of amine hydrochloride, m.p. 177°–80° C.

The amine was regenerated by treating the amine hydrochlorine with base and extraction with hexane. The hexane was removed at reduced pressure and the residue was allowed to stand whereupon it solidified. The solid melted at 79°–82° C.

EXAMPLE #16

N-[1,5-Bis(3',5'-di-t-butyl-4'-hydroxyphenyl)-3-pentyl]-N-n-octylamine

In a 1.7 l. rocking autoclave were placed 154 gm. (0.312 mole) of 1,5-bis(3',5'-di-t-butyl-4'-hydroxyphenyl) pentanone-3, 45 gm. of octylamine, 380 ml. of isopropanol and 6 gm. of 5% Pd/C. The mixture was heated at 115°–120° C and 680–745 PSIG of hydrogen for 5.25 hours. 98% of the theoretical amount of hydrogen was absorbed.

The catalyst was removed by filtration and the isopropanol was removed at reduced pressure. The residue was dissolved in hexane and treated with gaseous hydrogen chloride. The yield of amine hydrochloride melting at 119°–120° C was 137 gm.

The amine was regenerated by treating the amine hydrochloride with base and extracting with hexane; Index of refraction $N_D^{29} = 1.507$.

EXAMPLE #17

N-[1,5-Bis(3',5'-di-t-butyl-4'-hydroxyphenyl)-3-pentyl]-N-n-octadecylamine

In a 1.7 l. rocking autoclave were placed 200 gm. (0.405 mole) of 1,5-bis(3',5'-di-t-butyl-4'-hydroxyphenyl) pentanone-3, 112 gm. of n-octadecylamine, 245 ml. of isopropanol and 10 gm. of 5% Pd/C. The mixture was heated for 5 hours at 115°–120° C and 700–805 PSIG of hydrogen. Approximately 0.34 mole of hydrogen was absorbed.

A solid separated so the mixture was heated to boiling to redissolve the solid and the catalyst removed by filtration. The mixture was allowed to cool and the product removed by filtration.

The product was dissolved in acetone in order to remove the insoluble unreacted octadecylamine. The acetone was then removed at reduced pressure and the residue was dissolved in hexane and treated with hydrogen chloride. The resulting amine hydrochloride melted at 102°–104° C.

The amine was regenerated by treating the amine hydrochloride with base. The amine melted at 60° C.

EXAMPLE #18

N-[1,5-Bis(3',5'-di-t-butyl-4'-hydroxyphenyl)-3-pentyl]-N-cyclohexylamine

In a 1-gallon stirred autoclave were placed 200 gm. (0.405 mole) of 1,5-bis(3',5'-di-t-butyl-4'-hydroxyphenyl) pentanone-3, 47 gm. of cyclohexylamine, 1200 ml. of 2-propanol and 15 gm. of 5% Pd/C. The mixture was heated for 3.75 hours at 125° C and 695–725 PSIG of hydrogen. 0.47 mole of hydrogen was absorbed.

The catalyst was removed by filtration and the isopropanol was removed at reduced pressure. The residue was dissolved in hexane and treated with hydrogen chloride. The resulting amine hydrochloride melted at 210°–213° C.

The amine was regenerated by treating the amine hydrochloride with base. The amine melted at 118°–20° C.

Elemental analysis - Calc. C=81.05; H=10.99; N=2.42.

Found C=80.96; H=11.04; N=2.48.

EXAMPLE #19

N,N'-Bis[1,5-bis(3',5'-di-t-butyl-4'-hydroxyphenyl)-3-pentyl]ethylenediamine

In a 1-gallon stirred autoclave were placed 200 gm. (0.405 mole) of 1,5-bis(3',5'-di-t-butyl-4'-hydroxyphenyl) pentanone-3, 12.2 gm. of ethylenediamine, 1075 ml. of isopropanol and 25 gm. of 5% platinum on carbon (Pt/C). The mixture was heated for 2 hours at 50° C and 660–690 PSIG of hydrogen. 0.36 mole of hydrogen was absorbed.

The catalyst was removed by filtration and the isopropanol was removed at reduced pressure. The residue was dissolved in hot hexane and on cooling gave 125 gm. of product, m.p. 68°–70° C.

EXAMPLE #20

N,N'-Bis[1,5-bis(3',5'-di-t-butyl-4'-hydroxyphenyl)-3-pentyl]propylenediamine

In a 1.7 l. rocking autoclave were placed 100 gm. (0.203 mole) of 1,5-bis(3',5'-di-t-butyl-4'-hydroxyphenyl) pentanone-3, 7.4 gm. of propylenediamine, 475 ml. of isopropanol and 10 gm. of 5% Pd/C. The mixture was heated at 115°–120° C and 660–770 PSIG of hydrogen for 6.5 hours.

The catalyst was removed by filtration and the isopropanol was removed at reduced pressure. The residue was dissolved in hexane and treated with hydrogen chloride. The resulting amine hydrochloride melted at 135° C.

The amine was regenerated by treating the amine hydrochloride with base. The amine melted at 62°–4° C.

EXAMPLE #21

N,N'-Bis[1,5-bis(3',5'-di-t-butyl-4'-hydroxyphenyl)-3-pentyl]hexamethylenediamine

In a 1.7 l. rocking autoclave were placed 84.5 gm (0.17 mole) of 1,5-bis(3',5'-di-t-butyl-4'-hydroxyphenyl) pentanone-3, 9.9 gm. of hexamethylenediamine, 500 ml. of isopropanol and 10 gm. of 5% Pd/C. The mixture was heated for 5 hours at 100°–105° C and 695–760 PSIG of hydrogen; 0.22 mole of hydrogen was absorbed.

The catalyst was removed by filtration and the isopropanol was removed at reduced pressure. The residue was dissolved in hexane and treated with hydrogen chloride. The resulting amine hydrochloride melted at 228°–30° C.

The amine was regenerated by treating the amine hydrochloride with base. An oil was isolated.

EXAMPLE #22

N-[1,5-Bis(3',5'-di-t-butyl-4'-hydroxyphenyl)-3-pentyl]acetamide

In a 500 ml., three-neck, round-bottom flask equipped with a thermometer, mechanical stirrer and condenser were placed 30 gm. (0.061 mole) of 1,5-bis(3',5'-di-t-butyl-4'-hydroxyphenyl)-3-pentylamine, 250 ml. of acetic acid and 20 ml. of acetic anhydride. The mixture was refluxed for 5 hours and allowed to cool. The mixture was poured into water and the product removed by filtration. The solid was recrystallized from isopropanol-water. The yield of amide was 25 gm.; m.p. 144°–6° C.

Elemental analysis - Calc. C=76.16; H=10.31; N=2.60.
Found C=76.17; H=10.36; N=2.35.

EXAMPLE #23

N-[1,5-Bis(3',5'-di-t-butyl-4'-hydroxyphenyl)-3-pentyl]-stearamide

In a 500 ml. boiling flask were placed 40 gm. (0.081 mole) of 1,5-bis(3',5'-di-t-butyl-4'-hydroxyphenyl)-3-pentylamine, 20 ml. of triethylamine and 300 ml. of hexane. To this stirred mixture were added 30 gm. of stearoyl chloride. After about one-half hour, the mixture became very thick. It was diluted to one liter and brought to boiling. The triethylamine hydrochloride was removed by filtration and the solution allowed to cool. The solid amide separated and was removed by filtration and dried; m.p. 105°–7° C.

Elemental analysis - Calc. C=80.36; H=11.50; N=1.84.
Found C=80.15; H=11.57; N=2.00.

EXAMPLE #24

N-[1,5-Bis(3',5'-di-t-butyl-4'-hydroxyphenyl)-3-pentyl]-N-methylacetamide

In a 500 ml. three-neck, round bottom flask equipped with a thermometer, mechanical stirrer and condenser were placed 50 gm. (0.098 mole) of N-[1,5-bis(3',5'-di-t-butyl-4'-hydroxyphenyl)-3-pentyl]-N-methylamine, 150 ml. of acetic acid and 15 ml. of acetic anhydride. The mixture was heated at 95° C for 2 hours and then poured into water. A solid separated and was recrystallized from aqueous isopropanol. The yield of amide melting at 134°–6° C was 34 gm.

Elemental analysis - Calc. C=78.35; H=10.41; N=2.54.
Found C=78.33; H=10.51; N=2.57.

EXAMPLE #25

N-[1,5-Bis(3',5'-di-t-butyl-4'-hydroxyphenyl)-3-pentyl]-N-methyl stearamide

In a 1 l. three-neck, round-bottom flask equipped with a thermometer, mechanical stirrer and Claisen adapter with a dropping funnel and condenser were placed 50 gm. (0.098 mole) of N-[1,5-bis(3',5'-di-t-butyl-4'-hydroxyphenyl)-3-pentyl]-N-methylamine, 20 ml. of triethylamine and 500 ml. of hexane. To this stirred mixture were added 30 gm. of stearoyl chloride and the mixture was stirred for two hours.

The triethylamine hydrochloride was removed by filtration and the hexane was removed at reduced pressure. A material was isolated which solidified on standing; m.p. 79°–82° C.

EXAMPLE #26

N-[1,5-Bis(3',5'-di-t-butyl-4'-hydroxyphenyl)-3-pentyl]-N-n-butyl acetamide

In a 500 ml. three-neck, round-bottom flask equipped with a thermometer, mechanical stirrer and condenser were placed 55.1 gm. (0.1 mole) of N-[1,5-bis(3',5'-di-t-butyl-4'-hydroxyphenyl)-3-pentyl]-N-n-butylamine, 250 ml. of acetic acid and 20 ml. of acetic anhydride. The mixture was refluxed for 6 hours and cooled. The mixture was poured into water and a viscous oil separated. The oil was dissolved in hot aqueous isopropanol and allowed to cool. The yield of amide was 54 gm. melting at 124°–5° C.

Elemental analysis - Calc. C=78.87; H=10.69; N=2.36.
Found C=78.86; H=10.84; N=2.52.

EXAMPLE #27

N-[1,5-Bis(3',5'-di-t-butyl-4'-hydroxyphenyl)-3-pentyl]-N-n-butyl stearamide

In a 1 l. three-neck, round-bottom flask equipped with a thermometer, mechanical stirrer and a Claisen adapter equipped with a dropping funnel and condenser were placed 55.1 gm. (0.1 mole) of N-[1,5-bis(3',5'-di-t-butyl-4'-hydroxyphenyl)-3-pentyl]-N-n-butylamine, 30 ml. of triethylamine and 500 ml. of hexane. To this stirred mixture were added 31 gm. of stearoyl chloride. The mixture was stirred an additional four hours.

The triethylamine hydrochloride was removed by filtration and the hexane was removed at reduced pressure. The residue was dissolved in acetone in order to remove any stearic acid.

The solvent was removed at reduced pressure and the residual amide solidified on standing; m.p. 76°–8° C.

EXAMPLE #28

N-[1,5-Bis(3',5'-di-t-butyl-4'-hydroxyphenyl)-3-pentyl]-N-n-octyl acetamide

In a 500 ml. three-neck, round-bottom flask equipped with a thermometer, mechanical stirrer and condenser were placed 40 gm. (0.066 mole) of N-[1,5-bis(3',5'-di-t-butyl-4'-hydroxyphenyl)-3-pentyl]-N-n-octylamine, 25 ml. of acetic anhydride and 250 ml. of acetic acid. The mixture was heated at 90° C for 4 hours. The mixture was poured into water and an oily residue separated; Index of refraction $N_D^{29}$ = 1.513.

EXAMPLE #29

N-[1,5-Bis(3',5'-di-t-butyl-4'-hydroxyphenyl)-3-pentyl]-N-n-octyl stearamide

In a 1 l. three-neck, round-bottom flask equipped with a thermometer mechanical stirrer and a Claisen adapter with a dropping funnel and condenser were placed 40 gm. (0.066 mole) of N-[1,5-bis(3',5'-di-t-butyl-4'-hydroxyphenyl)-3-pentyl]-N-n-octylamine, 20 ml. of triethylamine and 400 ml. of hexane. To this stirred solution were added 21 gm. of stearoyl chloride and the mixture was stirred for 2 hours.

The triethylamine hydrochloride was removed by filtration and the hexane was removed at reduced pressure. The amide solidified on standing; m.p. 71°–3° C.

EXAMPLE #30

N-[1,5-Bis(3',5'-di-t-butyl-4'-hydroxyphenyl)-3-pentyl]-N-n-octadecyl acetamide

In a 500 ml. three-neck, round-bottom flask equipped with a thermometer, mechanical stirrer and condenser were placed 40 gm. (0.054 mole) of N-[1,5-bis(3',5'-di-t-butyl-4'-hydroxyphenyl)-3-pentyl]-N-n-octadecylamine, 25 ml. of acetic anhydride and 150 ml. of acetic acid. The solution was heated at 95° C for 5 hours and allowed to cool. It was poured into water and a viscous residue separated. The solvent was removed at reduced pressure and the residual amide solidified on standing; m.p. 73°–5° C.

EXAMPLE #31

N-[1,5-bis(3',5'-di-t-butyl-4'-hydroxyphenyl)-3-pentyl]-N-n-octadecyl stearamide In a 500 ml. boiling flask were placed 50 gm. (0.067 mole) of N-[1,5-bis(3',5'-di-t-butyl-4'-hydroxyphenyl)-3-pentyl]-N-n-octadecylamine, 20 ml. of triethylamine and 250 ml. of hexane. To this stirred mixture were added 20.3 gm. of stearoyl chloride and the mixture was stirred for 1 hour. The triethylamine hydrochloride was removed by filtration and the hexane was removed at reduced pressure. The residual amide solidified on standing; m.p. 58°–60° C.

EXAMPLE #32

N-[1,5-Bis(3',5'-di-t-butyl-4'-hydroxyphenyl)-3-pentyl]-N-cyclohexyl acetamide

In a 1.1 three-neck, round-bottom flask equipped with a thermometer, mechanical stirrer and condenser were placed 25 gm. (0.043 mole) of N-[1,5-bis(3',5'-di-t-butyl-4'-hydroxyphenyl)-3-pentyl]-N-cyclohexylamine, 25 ml. of acetic anhydride and 250 ml. of acetic acid. The mixture was heated at 95° C for 5 hours and allowed to cool. The mixture was poured into water and a solid separated. After recrystallization from hexane, the yield of amide melting at 151°–4° C was 25 gm.

EXAMPLE #33

N-[1,5-Bis(3',5'-di-t-butyl-4'-hydroxyphenyl)-3-pentyl]-N-cyclohexyl stearamide

In a 500 ml. boiling flask were placed 25 gm. (0.043 mole) of N-[1,5-bis(3',5'-di-t-butyl-4'-hydroxyphenyl)-3-pentyl]-N-cyclohexylamine, 20 ml. of triethylamine and 250 ml. of hexane. To the stirred mixture were added 13.1 gm. of stearoyl chloride. The mixture was stirred for one hour and the triethylamine hydrochloride was removed by filtration. The hexane was removed at reduced pressure; Index of refraction $N_D^{29} = 1.507$.

EXAMPLE #34

N,N'-Bis[1,5-bis(3',5'-di-t-butyl-4'-hydroxyphenyl)-3-pentyl]-N,N'-diacetyl ethylenediamine In a 500 ml. three-neck, round-bottom flask equipped with a thermometer, mechanical stirrer and condenser were placed 12 gm. (0.012 mole) of N,N'-bis[1,5-bis(3',5'-di-t-butyl-4'-hydroxyphenyl)-3-pentyl]ethylenediamine, 25 ml. of acetic anhydride and 250 ml. of acetic acid. The mixture was heated to 90° C for 7.5 hours. The volume was reduced to 100 ml. at reduced pressure and the mixture was allowed to cool. The yield of amide melting at 245°–6° C was 10.5 gm.

Elemental analysis — Calc. C=78.49; H=10.25; N=2.54. Found C=78.77; H=10.35; N=2.55/2.58

EXAMPLE #35

N,N'-Bis[1,5-bis(3',5'-di-t-butyl-4'-hydroxyphenyl)-3-pentyl]-N,N'-distearoyl ethylenediamine In a 1.1 three neck, round-bottom flask equipped with a thermometer, mechanical stirred and Claisen adapter with a dropping funnel and condenser were placed 30 gm. (0.029 mole) of N,N'-bis[1,5-bis(3',5'-di-t-butyl-4'-hydroxyphenyl)-3-pentyl]ethylenediamine, 20 ml. of triethylamine and 400 ml. of hexane. To this stirred mixture were added 18.2 gm. of stearoyl chloride and the mixture was stirred for 3.5 hours. The triethylamine hydrochloride was removed by filtration and the hexane was removed at reduced pressure. Index of refraction $N_D^{29} = 1.508$.

EXAMPLE #36

N,N'-Bis[1,5-bis(3',5'-di-t-butyl-4'-hydroxyphenyl)-3-pentyl]-N,N'-diacetyl propylenediamine In a 500 ml. three-neck, round-bottom flask equipped with a thermometer, mechanical stirrer and condenser were placed 20 gm. (0.019 mole) of N,N'-bis[1,5-bis(3',5'-di-t-butyl-4'-hydroxyphenyl)-3-pentyl]-propylenediamine, 25 ml. of acetic anhydride and 200 ml. of acetic acid. The mixture was heated at 95° C for 3 hours and allowed to cool. The mixture was poured into water and a solid separated. The amide melted at 100°–3° C and weighed 17 gm.

EXAMPLE #37

N,N'-Bis[1,5-bis(3',5'-di-t-butyl-4'-hydroxyphenyl)-3-pentyl]-N,N'-diacetyl hexamethylenediamine In a 500 ml. three-neck, round-bottom flask equipped with a thermometer, mechanical stirrer and condenser were placed 40 gm. (0.037 mole) of N,N'-bis[1,5-bis(3',5'-di-t-butyl-4'-hydroxyphenyl)-3-pentyl]hexamethylenediamine, 25 ml. of acetic anhydride and 200 ml. of acetic acid. The mixture was heated for 3 hours at 95° C. The mixture was poured into water and a gummy residue separated. The residue was stripped at 120° C at reduced pressure. The amide sintered at 95°–100° C.

EXAMPLE #38

N,N'-Bis[1,5-bis(3',5'-di-t-butyl-4'-hydroxyphenyl)-3-pentyl]-N,N'-dimethyl succinamide In a 500 ml. three-neck, round-bottom flask equipped with a thermometer, mechanical stirrer and Claisen adapter with a dropping funnel and condenser were placed 32 gm. of N-[1,5bis(3',5'-di-t-butyl-4'-hydroxyphenyl)-3-pentyl]-N-methylamine, 15 ml. of triethylamine and 250 ml. of hexane. To this stirred solution were added 4.68 gm. of succinyl chloride and then the mixture was refluxed for 4 hours.

The product was separated by filtration, washed with water and recrystallized from methanol. The product melted at 212°–14° C.

EXAMPLE #39

N[1,5-Bis(3',5'-di-t-butyl-4'-hydroxyphenyl)-3-pentyl]-benzamide

In a 500 ml. three-neck, round-bottom flask equipped with a thermometer, mechanical stirrer and Claisen adapter with a dropping funnel and condenser were placed 49.5 gm. of 1,5-bis(3',5'-di-t-butyl-4'-hydroxyphenyl)-3-pentyl amine, 15 ml. of triethylamine and 250 ml. of benzene. To this stirred solution were added 15 gm. of benzoyl chloride and then the mixture was refluxed for 4 hours.

The triethylamine hydrochloride was separated by filtration and the benzene was removed at reduced pressure. The residue was dissolved in hot hexane. The benzamide separated on cooling; m.p. 178°–80° C.

EXAMPLE #40

N-[1,5-Bis(3',5'-di-t-butyl-4'-hydroxyphenyl)-3-pentyl]-N-benzylamine

In a 1-gallon stirred autoclave were placed 100 gm. of 1,5-bis(3',5'-di-t-butyl-4'-hydroxyphenyl)pentanone-3, 25 gm. of benzylamine, 1200 ml. of isopropanol and 10gm. of 5% Pd/C. The mixture was heated for 4 hours at 50° C and 505–515 PSIG of hydrogen; 0.175 mole (87%) of hydrogen was absorbed.

The catalyst was separated by filtration and the alcohol was removed at reduced pressure. The residue was dissolved in hot hexane. On cooling, the benzylamine separated; m.p. 125°–7° C.

EXAMPLE #41

N-[1,5-Bis(3',5'-di-t-butyl-4'-hydroxyphenyl)-3-pentyl]-N-phenyl amine

In a 1-gallon stirred autoclave were placed 100 gm. of 1,5-bis(3',5'-di-t-butyl-4'-hydroxyphenyl)pentanone-3, 20 gm. of aniline, 1200 ml. of isopropanol and 10 gm. of 5% Pd/C. The mixture was heated for 2.75 hours at 50° C and 1.75 hours at 100° C and 500–580 PSIG of hydrogen; 0.14 mole (70%) of hydrogen was absorbed.

The catalyst was separated by filtration and the alcohol was removed at reduced pressure. The residue was dissolved in hot hexane. On cooling, the amine separated; m.p. 122°–3° C.

The following Example provides details on the preparation of a typical intermediate useful in this invention.

EXAMPLE #42

1,5-Bis(3',5'-di-t-butyl-4'-hydroxyphenyl)pentadien-1,4-one-3

In a 1 l., three-neck, round-bottom flask equipped with a thermometer, mechanical stirrer and a gas addition tube with condenser were placed 100 gm. of 3,5-di-t-butyl-4-hydroxybenzaldehyde, 13 gm. of acetone and 750 ml. of isopropanol. The mixture was cooled to 5°–10° C while bubbling in hydrogen chloride gas for 3.5 hours. The reaction mixture was poured into ice water and the product removed by filtration. The yield was 103 gm. This solid was recrystallized from 30% ethanol-water and it then melted at 252°–4° C.

EXAMPLE #43

Stabilization of polypropylene

The stabilizer (0.1 part by weight) was blended into Profax 6501 (Hercules unstabilized polypropylene resin: density 0.904; melt flow index 4.0 g. / 10 mins. at 230° C — ASTM D-1238) (100 parts by weight) on a mill at 330° F. This stabilized polypropylene was pressed into 75 mil sheets by means of a Farrel press and then buttons were punched from these sheets.

The same procedure was followed in order to prepare buttons containing 0.1 part of stabilizer, 0.4 part of dilauryl 3,3'-thiodipropionate (DLTDP) in 100 parts Profax 6501.

Three buttons of each sample of stabilized polymer were aged at 300° F (149° C) in a circulating air oven and the days to embrittlement were recorded. The break point was defined as the first sign of embrittlement or crumbling in two out of the three pieces.

| Stabilizer | Break Point Days Alone | with DLTDP |
|---|---|---|
| 1,5-bis(3',5'-di-t-butyl-4'-hydroxyphenyl)-3-pentyl acetate | 5 | 40 |
| 1,5-bis(3',5'-di-t-butyl-4'-hydroxyphenyl)-3-pentyl stearate | 14 | 55 |
| 1,5-bis(3',5'-di-t-butyl-4'-hydroxyphenyl)-3-pentyl benzoate | 17 | 43 |
| bis[1,5-bis(3',5'-di-t-butyl-4'-hydroxyphenyl)-3-pentyl]succinate | 20 | 41 |
| bis[1,5-bis(3',5'-di-t-butyl-4'-hydroxyphenyl)-3-pentyl]adipate | 19 | 53 |
| bis[1,5-bis(3',5'-di-t-butyl-4'-hydroxyphenyl)-3-pentyl]phthalate | 13 | 53 |
| bis[1,5-bis(3',5'-di-t-butyl-4'-hydroxyphenyl)-3-pentyl]thiodipropionate | 27 | 58 |
| Tris[1,5-bis(3',5'-di-t-butyl-4'hydroxyphenyl)-3-pentyl]phosphite | 13 | 28 |
| N-[1,5-bis(3',5'-di-t-butyl-4'-hydroxyphenyl)-3-pentyl]-N-n-butylamine | 12 | 40 |
| N-[1,5-bis(3',5'-di-t-butyl-4'-hydroxyphenyl)-3-pentyl]-N-n-octadecylamine | 13 | 40 |
| N-[1,5-bis(3',5'-di-t-butyl-4'-hydroxyphenyl)-3-pentyl]-N-cyclohexylamine | 13 | 35 |
| N,N'-bis[1,5-bis(3',5'-di-t-butyl-4'-hydroxyphenyl)-3-pentyl]ethylenediamine | 12 | 40 |
| N,N'-bis[1,5-bis(3',5'-di-t-butyl-4'-hydroxyphenyl)-3-pentyl]propylenediamine | 12 | 40 |
| N-[1,5-bis(3',5'-di-t-butyl-4'-hydroxyphenyl)-3-pentyl]acetamide | 8 | 42 |
| N-[1,5-bis(3',5'-di-t-butyl-4'-hydroxyphenyl)-3-pentyl]stearamide | 13 | 52 |
| N-[1,5-bis(3',5'-di-t-butyl-4'-hydroxyphenyl)-3-pentyl]-N-methylacetamide | 15 | 48 |
| N-[1,5-bis(3',5'-di-t-butyl-4'-hydroxyphenyl)-3-pentyl]-N-methyl stearamide | 16 | 63 |
| N-[1,5-bis(3',5'-di-t-butyl-4'-hydroxyphenyl)-3-pentyl]-N-n-butyl acetamide | 21 | 62 |
| N-[1,5-bis(3',5'-di-t-butyl-4'-hydroxyphenyl)-3-pentyl]-N-n-butyl stearamide | 17 | 62 |
| N-[1,5-bis(3',5'-di-t-butyl-4'-hydroxyphenyl)-3-pentyl]-N-n-octyl acetamide | 16 | 56 |
| N-[1,5-bis(3',5'-di-t-butyl-4'-hydroxyphenyl)-3-pentyl]-N-n-octyl stearamide | 14 | 52 |
| N-[1,5-bis(3',5'-di-t-butyl-4'-hydroxyphenyl)-3-pentyl]-N-n-octadecyl acetamide | 13 | 43 |
| N-[1,5-bis(3',5'-di-t-butyl-4'-hydroxyphenyl)-3-pentyl]-N-n-octadecyl stearamide | 17 | 42 |
| N-[1,5-bis(3',5'-di-t-butyl-4'-hydroxyphenyl)-3-pentyl]-N-cyclohexyl acetamide | 13 | 34 |
| N-[1,5-bis(3',5'-di-t-butyl-4'-hydroxyphenyl)-3-pentyl]-N-cyclohexyl stearamide | 14 | 50 |
| N,N'-bis[1,5-bis(3',5'-di-t-butyl-4'-hydroxyphenyl)-3-pentyl]-N,N'-diacetyl ethylenediamine | 14 | 63 |
| N,N'-bis[1,5-bis(3',5'-di-t-butyl-4'-hydroxyphenyl)-3-pentyl]-N,N'-distearoyl ethylenediamine | 9 | 69 |
| N,N'-bis[1,5-bis(3',5'-di-t-butyl-4'-hydroxyphenyl)-3-pentyl]-N,N'-diacetyl propylenediamine | 29 | 69 |
| N,N'-bis[1,5-bis(3',5'-di-t-butyl-4'-hydroxyphenyl)-3-pentyl]-N,N'-diacetyl hexamethylenediamine | 22 | 56 |
| Irganox 1076* (a commercial stabilizer) | 9 | 41 |

*—octadecyl 3-(3,5-di-t-butyl-4-hydroxyphenyl) propionate

Under the same conditions, the break point for Profax 6501 alone is less than 1 day and for Profax 6501 stabilized with 0.4 part of DLTDP in 100 parts Profax 6501 is 12 days. Thus, the synergistic effect demonstrated in the foregoing tabulation with regard to the combinations of stabilizers of this invention with DLTDP is most noteworthy.

EXAMPLE #44

Stabilization of high impact polystyrene

The stabilizer (0.1 part) was blended into Styrene 66 (unstabilized polystyrene) (Dow) (92 parts by weight) and Diene 55 (Firestone's solvent polymerized polybutadiene with a non-staining antioxidant; Mooney viscosity: 50–60) (8 parts by weight) on a mill at 300° F. This stabilized polystyrene was pressed into 75 mil sheets by means of a Farrel press and then cut into 1-½ inch squares.

The same procedure was used in order to prepare samples containing 0.1 part of stabilizer and 0.2 part of Polygard ® (tris(nonylphenyl)phosphite).

The squares were oven aged at 200° F in an air circulating oven and the days required for them to turn yellow were recorded, as set forth in the following tabulation:

| Stabilizer | Days Alone | with Polygard |
|---|---|---|
| 1,5-bis(3',5'-di-t-butyl-4'-hydroxyphenyl)-3-pentyl acetate | — | 60 |
| 1,5-bis(3',5'-di-t-butyl-4'-hydroxyphenyl)-3-pentyl stearate | — | 60 |
| Bis[1,5-bis(3',5'-di-t-butyl-4'-hydroxyphenyl)3-pentyl]adipate | 20 | 60 |
| Bis[1,5-bis(3',5'-di-t-butyl-4'-hydroxyphenyl)-3-pentyl]phthalate | — | 60 |
| N-[1,5-bis(3',5'-di-t-butyl-4'-hydroxyphenyl)-3-pentyl]acetamide | 30 | 50 |
| N-[1,5-bis(3',5'-di-t-butyl-4'-hydroxyphenyl)-3-pentyl]stearamide | 30 | 40 |
| N-[1,5-bis(3',5'-di-t-butyl-4'-hydroxyphenyl)-3-pentyl]-N-methyl acetamide | 20 | 70 |
| N-[1,5-bis(3',5'-di-t-butyl-4'-hydroxyphenyl)-3-pentyl]-N-methyl stearamide | 20 | 40 |
| N-[1,5-bis(3',5'-di-t-butyl-4'-hydroxyphenyl)-3-pentyl]-N-n-butyl acetamide | 30 | 70 |
| N-[1,5-bis(3',5'-di-t-butyl-4'-hydroxyphenyl)-3-pentyl]-N-n-butyl stearamide | 20 | 50 |
| N-[1,5-bis(3',5'-di-t-butyl-4'-hydroxyphenyl)-3-pentyl]-N-n-octyl acetamide | 20 | 50 |
| N-[1,5-bis(3',5'-di-t-butyl-4'-hydroxyphenyl)-3-pentyl]-N-n-octyl stearamide | 20 | 50 |
| N-[1,5-bis(3',5'-di-t-butyl-4'-hydroxyphenyl)-3-pentyl]-N-n-octadecyl acetamide | 20 | 70 |
| N-[1,5-bis(3',5'-di-t-butyl-4'-hydroxyphenyl)-3-pentyl]-N-n-octadecyl stearamide | 10 | 10 |
| N-[1,5-bis(3',5'-di-t-butyl-4'-hydroxyphenyl)-3-pentyl]-N-cyclohexyl acetamide | 20 | 40 |
| N-[1,5-bis(3',5'-di-t-butyl-4'-hydroxyphenyl)-3-pentyl]-N-cyclohexyl stearamide | 20 | 50 |
| N,N'-Bis[1,5-bis(3',5'-di-t-butyl-4'-hydroxyphenyl)-3-pentyl]-N,N'-distearoyl ethylenediamine | 10 | 70 |
| N,N'-Bis[1,5-bis(3',5'-di-t-butyl-4'-hydroxyphenyl)-3-pentyl]-N,N'-diacetyl propylenediamine | 10 | 70 |
| N,N'-Bis[1,5-bis(3',5'-di-t-butyl-4'-hydroxyphenyl)-3-pentyl]-N,N'-diacetyl hexamethylenediamine | 10 | 50 |
| 2,6-di-t-butyl-p-cresol | 20 | 70 |
| Irganox 1076 | 20 | 50 |

Under the same conditions, the days required for turning yellow for unstabilized high impact polystyrene and for such polystyrene stabilized only with 0.2 part of Polygard were less than 1 and 30, respectively. Thus, synergism has been demonstrated for the stabilizers of this invention in combination with Polygard.

EXAMPLE #45

Stabilization of EPDM

Unstabilized EPDM (58% ethylene; 32% propylene; 10% ethylidene norbornene; intrinsic visc. 2.3) (100 parts by weight) was dissolved in excess hexane. To this solution was added 0.15 parts of stabilizer and the solution was shaken in order to dissolve the stabilizer. The solvent was allowed to evaporate so as to obtain the stabilized polymer.

This stabilized polymer was then subjected to an oxygen absorption test according to the method described by J. Shelton in ASTM Special Training Publication #89 (March 2, 1949). This test records the time required by 1 gm. of polymer to absorb 20 ml. of oxygen. The minimum requirement for passing the test is 420 min.

| Stabilizer | Time, mins. |
|---|---|
| 1,5-Bis(3',5'-di-t-butyl-4'-hydroxyphenyl)-3-pentyl benzoate | > 420 |
| Bis[1,5-bis(3',5'-di-t-butyl-4'-hydroxyphenyl)-3-pentyl]succinate | > 420 |
| Tris[1,5-bis(3',5'-di-t-butyl-4'-hydroxyphenyl)-3-pentyl]phosphite | > 420 |
| Irganox 1076 | > 420 |
| Blank (no stabilizer) | 230 |

The effectiveness of the compounds of this invention for stabilizing ethylene-propylene-nonconjugated diene elastomeric terpolymers has thus been demonstrated.

What is claimed is:

1. A compound having the formula:

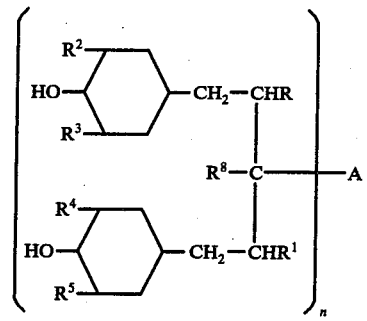

wherein R and $R^1$ may be the same or different and are hydrogen, alkyl having 1 to 4 carbon atoms, or alkylene or alkylidene having 1 to 3 carbon atoms and participating in a carbocyclic ring having 5 to 7 carbons, said ring including the carbon to which A is attached, $R^2$, $R^3$, $R^4$ and $R^5$ are hydrogen, alkyl of from 1 to 9 carbons, cycloalkyl having 5 to 7 carbon atoms, aryl having 6 to 10 carbon atoms, or aralkyl or alkaryl of from 7 to 10 carbon atoms; A is —N($R^6$)2, —N($R^6$)$R^7$N($R^6$)—, wherein $R^6$ is hydrogen, alkyl having 1 to 18 carbon atoms, cycloalkyl of from 3 to 7 carbon atoms, aryl having 6 to 10 carbons, or aralkyl having 7 to 10 carbon atoms; and when A comprises a plurality of $R^6$ groups they may be the same or different; $R^7$ is an alkylene or alkylidene having 1 to 8 carbon atoms, or arylene having from 6 to 10 carbon atoms; $R^8$ is hydrogen, alkyl having 1 to 18 carbon atoms, cycloalkyl having 3 to 7 carbon atoms, aryl having 6 to 10 carbon atoms, or alkaryl or aralkyl having 7 to 10 carbon atoms; and $n$ has a value of 1 to 2 corresponding to the functionality of A.

2. The compound of claim 1 wherein R and $R^1$ are selected from the group consisting of hydrogen, methyl, ethyl, methylene, ethylene, ethylidene, and isopropylidene; $R^2$, $R^3$, $R^4$ and $R^5$ are selected from the group consisting of hydrogen, methyl, ethyl, propyl, isopropyl, n-butyl, iso-butyl, sec-butyl, tert-butyl, cyclohexyl and alpha-methylstyryl; $R^6$ is hydrogen, alkyl having 1 to 18 carbon atoms, cycloalkyl having 5 to 7 carbon atoms, aryl having 6 to 10 carbon atoms or aralkyl having 7 to 10 carbon atoms; $R^7$ is ethylene; and $R^8$ is selected from hydrogen, methyl, ethyl, propyl, isopropyl, butyl, cyclohexyl and phenyl.

3. The compound of claim 1, wherein R and $R^1$ are hydrogen, methyl or methylene; $R^2$, $R^3$, $R^4$ and $R^5$ are tert-butyl; and $R^6$ is hydrogen, alkyl having 1 to 10 carbon atoms, cycloalkyl having 5 to 6 carbon atoms, aryl having 6 to 10 carbon atoms or aralkyl having 7 carbons.

4. N-[1,5-Bis(3',5'-di-t-butyl-4'-hydroxyphenyl)-3-pentyl]-N-n-butylamine.

5. N-[1,5-Bis(3',5'-di-t-butyl-4'-hydroxyphenyl)-3-pentyl]-N-n-octadecylamine.

6. N-[1,5-Bis(3',5'-di-t-butyl-4'-hydroxyphenyl)-3-pentyl]-N-cyclohexylamine.

7. N,N'-Bis[1,5-bis(3',5'-di-t-butyl-4'-hydroxyphenyl)-3-pentyl]ethylenediamine.

8. N,N'-Bis[1,5-bis(3',5'-di-t-butyl-4'-hydroxyphenyl)-3-pentyl]propylenediamine.

9. A composition comprising an organic material normally subject to deterioration caused by air, heat or light in intimate admixture with, an amount effective to protect said organic material against such deterioration, a chemical of the formula

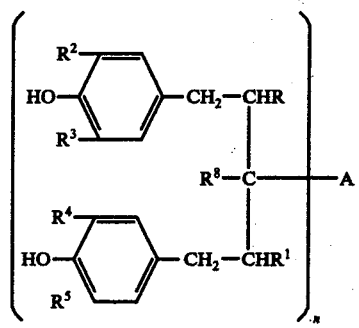

wherein the meanings of R through $R^5$, $R^8$ and $n$ are as set forth in claim 1.

10. The composition of claim 9 which also contains, in amount effective to protect said organic material against such deterioration, a dialkyl 3,3'-thiodipropionate, in which the alkyl groups have from 8 to 20 carbons.

11. The composition of claim 10 in which said organic material is polypropylene.

12. The composition of claim 10 in which said thiodipropionate is dilauryl 3,3'-thiodipropionate.

13. The composition of claim 12 in which said chemical is N-[1,5-bis(3',5'-di-t-butyl-4'-hydroxyphenyl)-3-pentyl]-N-n-butylamine.

14. The composition of claim 12 in which said chemical is N-[1,5-bis(3',5'-di-t-butyl-4'-hydroxyphenyl)-3-pentyl[-N-n-octadecylamine.

15. The composition of claim 12 in which said chemical is N-[1,5-bis(3',5'-di-t-butyl-4'-hydroxyphenyl)-3-pentyl]-N-cyclohexylamine.

16. The composition of claim 12 in which said chemical is N,N'-bis[1,5-bis(3',5'-di-t-butyl-4'-hydroxyphenyl)-3-pentyl]ethylenediamine.

17. The composition of claim 12 in which said chemical is N,N'-bis[1,5-bis(3',5'-di-t-butyl-4'-hydroxyphenyl)-3-pentyl]propylenediamine.

* * * * *